Patented Jan. 2, 1940

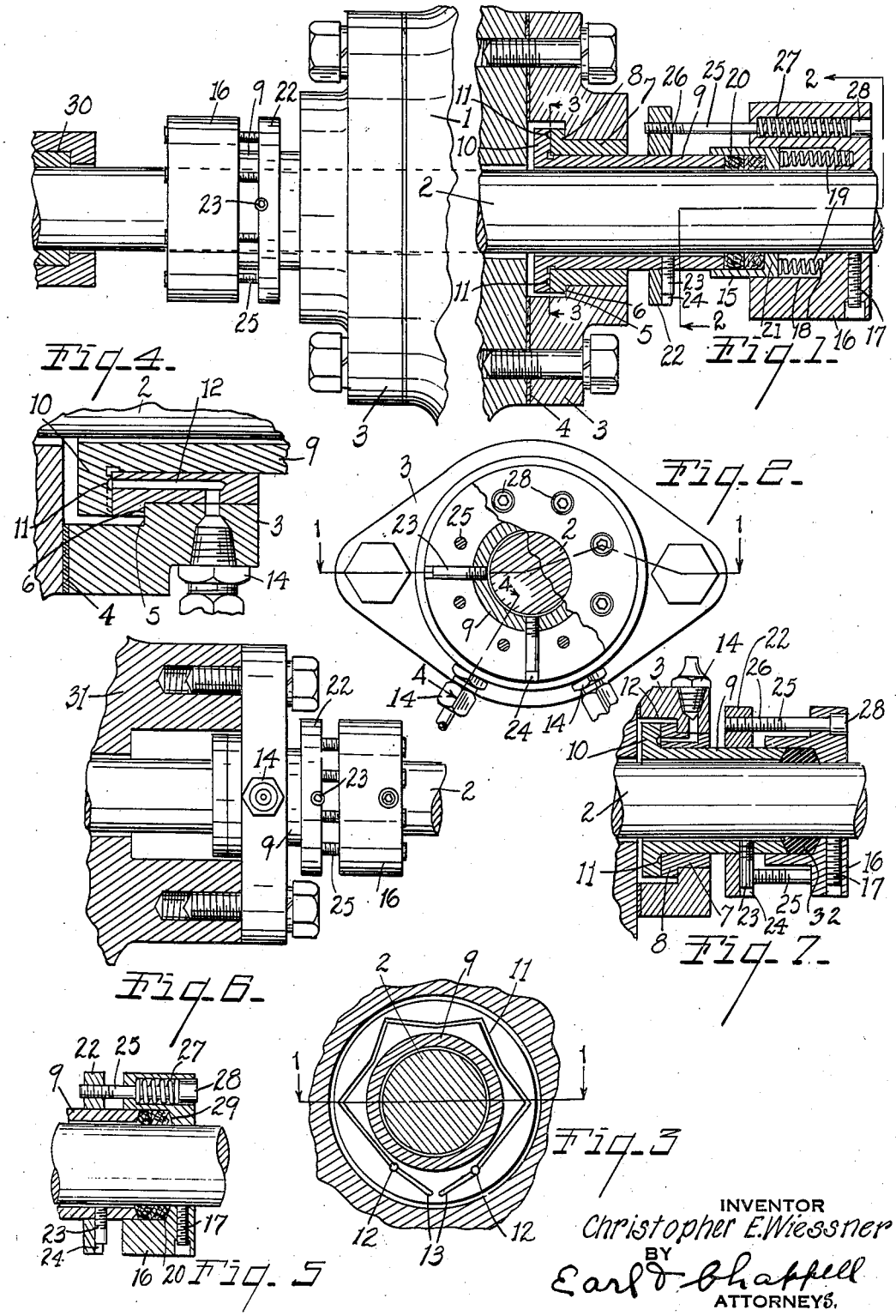

2,185,876

UNITED STATES PATENT OFFICE 2,185,876

SHAFT PACKING

Christopher E. Wiessner, Kalamazoo, Mich., assignor to Durametallic Corporation, Kalamazoo, Mich.

Application March 14, 1938, Serial No. 195,858

6 Claims. (Cl. 286—5)

This invention relates to improvements in shaft packings.

The main objects of this invention are:

First, to provide a packing for pumps and the like which is very efficient and durable, providing a metal-to-metal seal for associated moving parts.

Second, to provide a packing of this character which is very compact and may be installed in relatively confined spaces.

Third, to provide a packing which is efficient in action and adjustable to compensate for wear and for shrinkage or compacting of the sealing material in joints of both relatively fixed or non-moving and relatively moving parts.

Fourth, to provide a shaft packing which comprises an enclosed sealing element whose adjusting parts are entirely exposed for adjustment and/or removal to replace the packing material.

Fifth, to provide a shaft packing for a pump or other device in which the adjusting members are remote from or out of contact with water or other substances handled thereby and are not susceptible to becoming ineffective through clogging or accumulation of material thereabout.

Sixth, to provide a packing for a pump having these advantages which is very simple and economical in its parts and in which the minor parts may be removed for replacement without disassembling of the pump.

Objects relating to details and economies of the invention will appear from the description to follow.

Preferred embodiments of the invention are illustrated in the accompanying drawing, in which:

Fig. 1 is a fragmentary enlarged view of a packing embodying the features of the invention, partially sectioned along the line 1—1 of Figs. 2 and 3.

Fig. 2 is an end view partially broken away and in transverse section on line 2—2 of Fig. 1.

Fig. 3 is a fagmentary view in section on line 3—3 of Fig. 1.

Fig. 4 is a fragmentary view in section on line 4—4 of Fig. 2, illustrating further the structure of the invention.

Fig. 5 is a fragmentary view in longitudinal section illustrating a modified form or embodiment of the invention.

Fig. 6 is a fragmentary view in partially longitudinal section, illustrating details of a modified construction.

Fig. 7 is a fragmentary view in longitudinal section of a still further modified embodiment.

In hitherto known devices of the type described, wherein the sealing surface was located inside the stuffing box of the pump, considerable objection has been encountered because of difficulties in making adjustments to regulate the pressure on the packing material, where such adjustments were possible, and also because of the fact that frequently the adjusting parts were completely enclosed within the stuffing box or members associated therewith, with the result that corrosion of the parts was present or else objectionable clogging when materials containing solids, such as lime, paper stock, grits, scale, or heavy viscous liquids, such as tar, asphalt, and clays, were handled by the pump. The device of the present invention eliminates all of the difficulties by providing a packing which may be repeatedly adjusted until it is completely worn out, without being removed from the pump, and which is adjustable to compensate for all wear on the packing material without disturbing the sealing faces thereof. Moreover, the adjusting elements of the packing are exposed and simple in nature as well as economical of space, being capable of being mounted adjacent to a stuffing box in a relatively small space. The provisions of the invention eliminate the necessity for special machine work on the pump, such as drilling and tapping of adjusting holes and in many cases it is possible to install the same without dismantling the pump. Of particular importance in the invention is the fact that all adjustments are visible and easy to make and the method of making adjustments is similar to the common practice for flexible packings, wherefore most persons skilled in the art will readily understand the use of the device.

A further advantage of the construction according to the invention is that inasmuch as it requires no stuffing box, it will enable manufacturers of pumps to shorten their pump shafts and avoid "whip" and "run-out." This shortening of the pump makes it much more sturdy and of course reduces the cost of manufacture of the same.

Referring to the drawing, reference numeral 1 indicates a conventional pump housing through the end of which the shaft 2 extends. I provide a closure or adapter plate 3 which is bolted to the housing with a suitable gasket 4 interposed, the said plate being counterbored at 5 to provide an annular shoulder 6.

An insert or bushing 7 of suitable bearing material is fitted in plate 3 inside shoulder 6, the said bushing being annularly flanged at 8 to engage the shoulder.

Surrounding the shaft 2, preferably with a substantial clearance, is an elongated sleeve-like sealing member 9 provided with an annular sealing flange 10 at its inner end adapted to coact and having a sealing running engagement with the inner end of the bushing 7. Said flange 10 is provided on the side adjacent bushing 7 with a zigzag fluid seal groove 11 covering a considerable portion of the radial area of the flange. (See Fig. 3.) As illustrated, the groove is roughly star-shaped. The particular shape of the groove, may, of course, be altered as desired, however provision should be made that the same furnish a fluid seal sweeping over a considerable part of the area of the flange. The insert 7 has axial bores 12 communicating with groove 11 adjacent the ends 13 thereof and also communicating with radial fluid feed and return fittings 14 which are inserted in closure plate 3.

Sealing member 9 projects outwardly through the closure plate and into an axially slidable thimble 15 which surrounds the shaft 2 and is in turn received in the chamber collar 16 fixed to the shaft 2 by set screws 17. In the recess 18 of this collar receiving the thimble 15 I place a number of compression springs 19 bearing against the thimble and urging the same axially in a manner to compress the rings of packing material 20 which are placed inside thimble 15 in the space between the radial flange 21 of the same and the end of sealing member 9. The rings are arranged within this space so as to provide an effective seal axially of the shaft. It will be understood that there is no rotative movement between this packing or thimble 15 and the shaft.

The sealing member 9 is provided with a thrust ring 22 which is loosely mounted on the sealing member, but is held against rotative movement and axially by means of the radial pins 23 threaded into the sleeve and engageable in radial recesses 24 in the outer face of the ring.

The collar 16 is drilled and countersunk parallel to its axis at a plurality of spaced points to receive the adjusting screws 25 which have threaded engagement with the drilled and tapped holes 26 in the thrust ring 22.

Coiled springs 27 are arranged within the bores in the collar to engage the heads 28 of the screws and impart a yielding stress to the sealing member.

In operation, the sealing member 9 rotates with the shaft, and the grooved face of its sealing flange 10 coacting with the face of the sealing member of the closure plate, which in this case is the bushing 7, forms an effective fluid seal between the sealing member and the closure plate. The packing material 20 effectively seals the joint at the outer end of the sealing element and this material is maintained tightly against the end of member 9 by the thimble 15 and springs 19; i. e., the sealing member 9 and the springs 19 thrust against opposite ends of the material to compress the same against shaft 2.

On the opposite side of pump housing 1, I illustrate a somewhat modified form of my invention, details of which are further disclosed in Fig. 5. This seal includes a sealing member 9 similar in all respects to that described above, save for the fact that the end thereof is received directly in the collar 16 with the rings of packing material 20 disposed in the space 29 between the collar, the shaft, and the end of member 9. If desired, the end walls of this space may be beveled so as to urge the sealing material into tight engagement with the shaft.

Reference numeral 30 in Fig. 1 designates the adjacent bearing for the shaft 2 and serves to illustrate the fact that the packing may be loosened and dismantled for replacement of the packing material in a very small space. The closure plate is preferably relatively flat.

In the modification shown in Fig. 6, I show my improvements as adapted to a structure in which a packing box 31 of a conventional type is provided. In this structure, there is no necessity of countersinking the closure plate as the chamber is already provided. However, where embodied in an original construction, the packing box projections 31 can be omitted. In this form, the details of the sealing provisions are shown similar to those just described with reference to Fig. 5. However, it is apparent that either of the seals illustrated in Fig. 1 is well adapted for use, whether or not a stuffing box is present.

In Fig. 7, I illustrate a still further modified form of the invention, which omits compression springs 19 or 27, substituting therefor a ring of packing material 32 which resilient in nature, the said ring performing the double function of sealing the shaft and maintaining tension on the screws 25 to preserve the operative relation of the parts.

To provide lubrication for the sealing surfaces and as an alternative for the feed and return fittings 14, it will be apparent that suitable oil cups or equivalent lubricant feed means may be provided to supply the sealing surface with sealing fluid.

I have illustrated and described my improvements in embodiments which I consider very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. The combination with a rotatable shaft, of a closure member through which said shaft projects, a rotatable sleeve-like sealing member on said shaft rotatable within said closure member and provided with an annular sealing element at its inner end in rotatable sealing engagement with a coacting sealing element on said closure member, a collar secured to said shaft and having an inwardly facing packing chamber surrounding said shaft and receiving the outer end of said sealing member, packing material arranged in said chamber, the end of said sealing member disposed within said collar constituting a thrust member for said packing material, a draw member mounted on said sealing member, threaded adjusting means carried by said collar and having threaded engagement with said draw member, and spring means arranged to coact with said adjusting means for applying yielding thrust to said sealing member.

2. The combination with a rotatable shaft, of a closure member through which said shaft projects, a rotatable sleeve-like sealing member on said shaft provided with an annular sealing element at its inner end in rotatable sealing engagement with a coacting sealing element on said closure member, a collar secured to said shaft, packing material for said shaft between said sealing member and said collar, said sealing member constituting a thrust member for compressing said packing material, a draw ring detachably mounted on said sealing member, and adjusting screws carried by said collar and having threaded engagement with said draw ring.

3. The combination with a rotatable shaft, of a closure member through which said shaft projects, a rotatable sleeve-like sealing member on said shaft provided with an annular sealing element at its inner end and in rotatable sealing engagement within the closure member with a coacting sealing element on said closure member, one of said sealing elements being grooved to provide an annular fluid seal between the elements, means for supplying sealing fluid to the groove, a collar secured to said shaft, said sealing member and collar providing a packing chamber surrounding said shaft, packing material arranged in said chamber, said sealing member constituting a thrust member for said packing material, and adjustable spring means connecting said sealing member and collar, for applying yielding thrust to said sealing member.

4. The combination with a rotatable shaft, of a closure member through which said shaft projects, a rotatable sleeve-like sealing member on said shaft provided with an annular sealing element at its inner end in rotatable sealing engagement within the closure member with a coacting sealing element on said closure member, a collar embracing said shaft and providing an inwardly facing packing chamber surrounding said shaft and receiving the outer end of said sealing member, packing material arranged in said chamber, the end of said sealing member disposed within said collar constituting a thrust member for said packing material, and means resiliently connecting said sealing member and collar to compress said packing material.

5. The combination with a rotatable shaft, of a closure member through which said shaft projects, a rotatable sleeve-like sealing member embracing said shaft but in non-contacting relation thereto provided with a flange-like sealing element at its inner end in rotatable bearing engagement with a coacting sealing element on said closure member, a collar secured to said shaft and having an annular recess in its inner end, a packing sleeve telescopingly associated in said recess and with the outer end of said sealing member, packing material within said packing sleeve, springs within said collar acting to urge said packing sleeve toward said sealing member, and an adjustable connection between said collar and said sealing member.

6. The combination with a rotatable shaft, of a closure member through which said shaft projects, a rotatable sleeve-like sealing member embracing said shaft provided with a flange-like sealing element at its inner end in rotatable bearing engagement internally of the closure member with a coacting sealing element on said closure member, a collar secured to said shaft, a shaft packing for said sealing member between said sealing member and collar, and an adjustable connection between said collar and said sealing member for compacting said packing and urging said sealing elements together.

CHRISTOPHER E. WIESSNER.